(12) United States Patent
Kim et al.

(10) Patent No.: US 8,320,306 B2
(45) Date of Patent: Nov. 27, 2012

(54) APPARATUS AND METHOD FOR IMPROVING RECEPTION PERFORMANCE IN A SMART ANTENNA SYSTEM

(75) Inventors: Yong-Seok Kim, Suwon-si (KR); Young-Hoon Kwon, Seongnam-si (KR); Soon-Young Yoon, Seoul (KR); Sang-Hoon Sung, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1360 days.

(21) Appl. No.: 11/545,240

(22) Filed: Oct. 10, 2006

(65) Prior Publication Data

US 2007/0099665 A1 May 3, 2007

(30) Foreign Application Priority Data

Oct. 10, 2005 (KR) ........................ 10-2005-0094862

(51) Int. Cl.
*H04W 4/00* (2009.01)
(52) U.S. Cl. ....... 370/329; 370/208; 370/210; 455/63.1; 455/63.4; 455/561; 455/562.1
(58) Field of Classification Search .................. 370/329, 370/208, 210; 455/63.1, 63.4, 561, 562.1
See application file for complete search history.

(56) References Cited

U.S. PATENT DOCUMENTS

| | | | | |
|---|---|---|---|---|
| 6,442,130 B1* | 8/2002 | Jones et al. | ................... | 370/208 |
| 6,621,809 B1* | 9/2003 | Lee et al. | ...................... | 370/335 |
| 6,801,580 B2* | 10/2004 | Kadous | ......................... | 375/267 |
| 7,194,041 B2* | 3/2007 | Kadous | ......................... | 375/267 |
| 2002/0111191 A1 | 8/2002 | Takatori et al. | | |
| 2002/0163896 A1* | 11/2002 | Hiramatsu | ................... | 370/335 |
| 2003/0052819 A1* | 3/2003 | Jacomb-Hood et al. | ...... | 342/379 |
| 2003/0128679 A1* | 7/2003 | Ishiguro et al. | ............... | 370/335 |
| 2003/0162551 A1* | 8/2003 | Atarashi et al. | ............... | 455/456 |
| 2004/0081121 A1* | 4/2004 | Xu | ................................. | 370/329 |
| 2004/0131134 A1* | 7/2004 | Hiroyasu | ...................... | 375/347 |
| 2004/0156443 A1* | 8/2004 | Dent | ............................. | 375/267 |

FOREIGN PATENT DOCUMENTS

| | | |
|---|---|---|
| KR | 1020000048621 | 7/2000 |
| KR | 1020020022109 | 3/2002 |
| KR | 1020030064869 | 8/2003 |
| KR | 1020050057188 | 6/2005 |

\* cited by examiner

*Primary Examiner* — Rafael Pérez-Gutiérrez
*Assistant Examiner* — Liton Miah
(74) *Attorney, Agent, or Firm* — The Farrell Law Firm, P.C.

(57) ABSTRACT

An apparatus and method for improving the reception performance of a Mobile Station (MS) in a multiple antenna system are provided. In an apparatus of a Base Station (BS) in the multiple antenna system, upon receipt of a request for interference cancellation for a first MS serviced by a neighbor BS, a channel estimator estimates a channel from the first MS and a channel from a second MS serviced by the BS. A beam coefficient generator generates a first beam coefficient based on channel estimates of the first and second MSs and a second beam coefficient based on the channel estimate of the second MS. An interference cancellation decider determines whether to perform interference cancellation for the first MS using the first and second beam coefficients.

23 Claims, 7 Drawing Sheets

APPARATUS AND METHOD FOR
IMPROVING RECEPTION PERFORMANCE
IN A SMART ANTENNA SYSTEM

PRIORITY

This application claims priority under 35 U.S.C. §119 to a Korean application filed in the Korean Intellectual Property Office on Oct. 10, 2005 and assigned Serial No. 2005-94862, the contents of which are incorporated herein by reference.

BACKGROUND OF THE INVENTION

1. Field of the Invention

The present invention relates generally to an apparatus and method for improving the reception performance in a smart antenna system, and in particular, to an apparatus and method for improving the reception performance of a Mobile Station (MS) by canceling interference from a neighbor Base Station (BS) that affects the reception performance of the MS in a smart antenna system.

2. Description of the Related Art

The performance and capacity of a mobile communication system are basically limited by the features of radio propagation channels, including co-channel interference and path loss between cells or within a cell, multipath fading, signal delay, Doppler spread, and shadowing. To make up for the performance and capacity limits, mobile communication systems adopt techniques such as power control, channel coding, rake reception, diversity antenna, cell sectorization, frequency division, and spectrum spread.

With the advent of the wireless multimedia era, the demand for high-speed transmission of a large volume of data on radio channels is ever increasing. High-speed data transmission requires high transmit power and a wide transmission bandwidth, compared to general data transmission. Accordingly, the effect of high-speed data has to be compensated for in a hybrid cell environment with a variety of service signals. A promising solution for commercialization to performance degradation caused by interference and channel characteristics is smart antenna technology.

Figure 1:
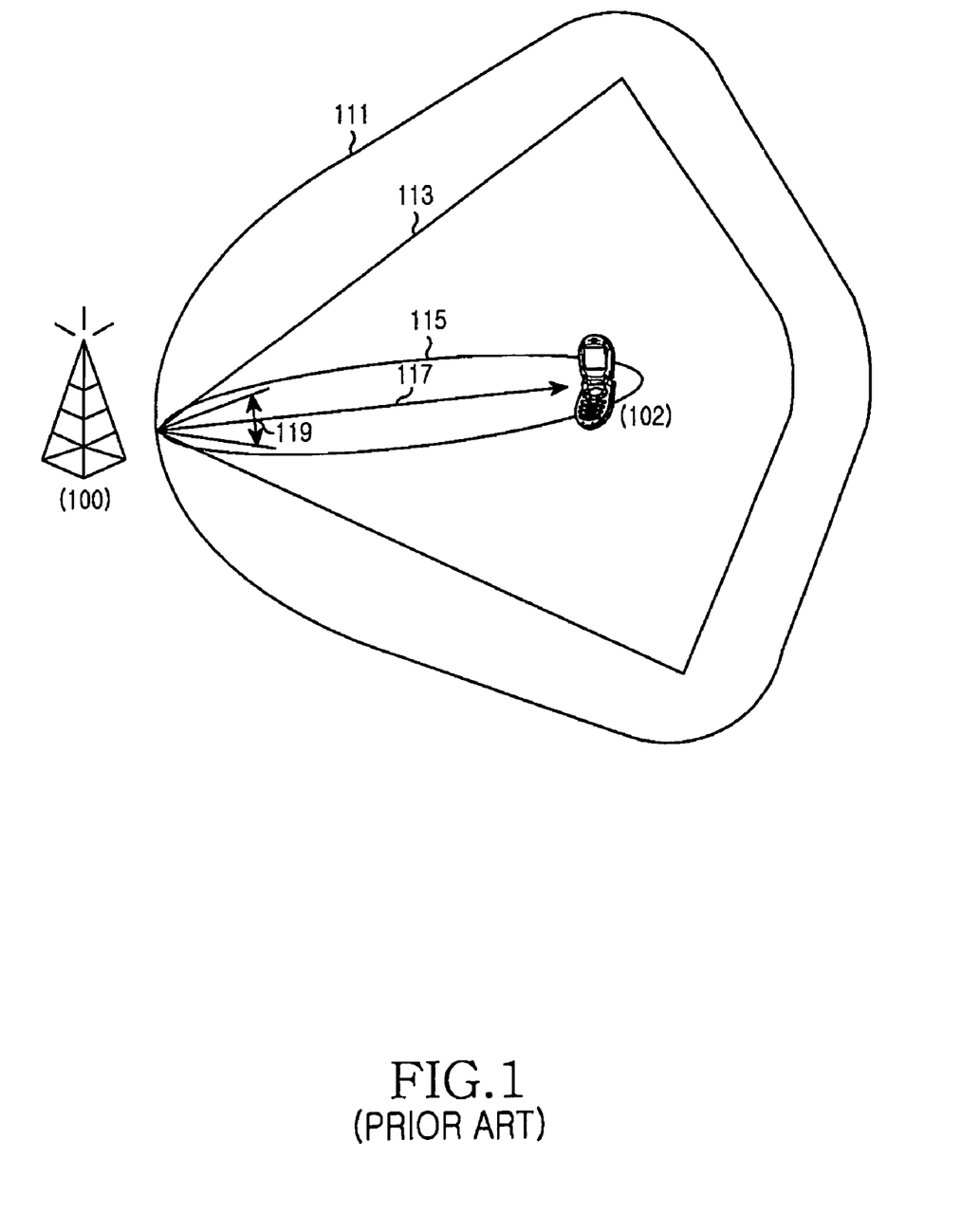
FIG. 1 illustrates a beam pattern in a typical smart antenna system according to the prior art.

FIG. 1 shows a beam pattern in a typical smart antenna system. A BS 100 forms the beam pattern 111 of a pilot signal so the beam pattern 111 may cover the cell area 113 of the BS 100 in the smart antenna system. As to the beam pattern 115 of a traffic signal, the BS 100 forms it to direct only to an MS 102. When sending a traffic signal to the MS 102 within the service area 113, the BS 100 estimates the direction 117 of the MS 102 and steers a beam for the traffic signal to the MS 102. The beam pattern 115 of the traffic signal is narrowed to thereby reduce transmit power.

The transmission path between the BS 100 and the MS 102 is defined by radio resources. A downlink signal from the BS 100 to the MS 102 may reach the MS 102 directly along the direction 117, but typically it is subject to multipath fading 119. That is, it experiences reflection, refraction and scattering according to the surrounding topography before arriving at the MS 102. If the signal is spread in other adjacent directions as well as in the direction of the MS 102, this phenomenon is called angular spread.

If the beam pattern 115 of the traffic signal does not include all the angular spread, the traffic signal and the pilot signal arrive at the MS 102 from different propagation paths. As a result, the traffic signal differs from the pilot signal in phase. The MS 102 compensates for the phase of the traffic signal using the pilot signal and the difference in phase leads to a considerable decrease in the reception performance of the MS 102. Accordingly, the BS 100 has to form the beam pattern 115 including the angular spread so the traffic signal and the pilot signal have the same phase.

Figure 2:
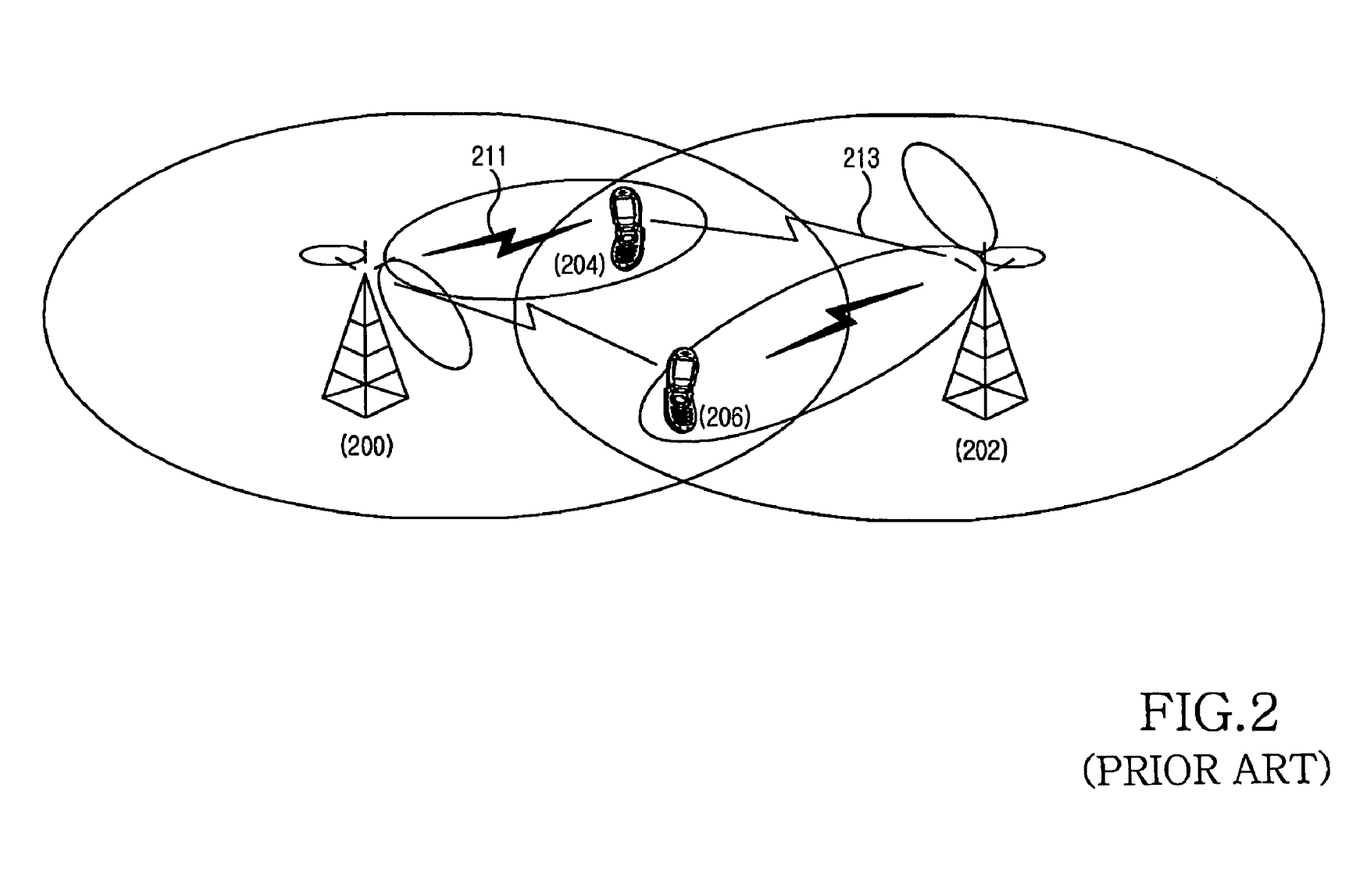
FIG. 2 illustrates the configuration of the typical smart antenna system according to the prior art.

FIG. 2 shows typical smart antenna system according to the prior art. A first BS 200 (BS 1) forms a traffic beam pattern 211 for a first MS 204 (MS 1) within its cell area, and a second BS 202 (BS 2) forms a traffic beam pattern for a second MS 206 (MS 2) within its cell area.

When MS 1 is located at a cell boundary between the two BSs 200 and 202, i.e. in a handover region, the strength of a signal from the serving BS 200 becomes weak at MS 1, and increasing interference from the neighbor BS 202 leads to a decrease in the Carrier-to-Interference Ratio (C/I) of MS 1. MS 2 is also subject to the same effect as MS 1. The C/I is expressed by Equation (1)

$$C/I_{MS} = \frac{S_{sBS}}{I_{sBS} + I_{nBS1} + \ldots + I_{nBSm} + N_o} \quad (1)$$

where $S_{sBS}$ denotes the signal strength of the serving BS, $I_{sBS}$ denotes the internal interference of the serving BS, $I_{nBSm}$ denotes interference from an $m^{th}$ neighbor BS, and $N_o$ denotes noise.

As described above, when the MS is located at the cell boundary between the serving BS and the neighbor BS, the C/I of the MS is decreased by interference from a neighbor BS, thereby degrading reception performance.

SUMMARY OF THE INVENTION

An object of the present invention is to substantially solve at least the above problems and/or disadvantages and to provide at least the advantages below. Accordingly, an object of the present invention is to provide an apparatus and method for preventing degradation of reception performance by increasing the C/I of an MS in a smart antenna system.

Another object of the present invention is to provide an apparatus and method for forming a beam for a second MS serviced by a second BS, taking into account the channel information of a first MS serviced by a first BS in a smart antenna system.

The above objects are achieved by providing an apparatus and method for improving the reception performance of an MS in a multiple antenna system.

According to one aspect of the present invention, in an apparatus of a BS in a multiple antenna system, a channel state checker checks the channel state of an MS serviced by the BS. An interference cancellation decider makes a determination whether to cancel interference for the MS according to the channel state of the MS. A channel allocator makes a determination whether to allocate a fixed channel to the MS according to the determination of the interference cancellation decider.

According to another aspect of the present invention, in an apparatus of a BS in a multiple antenna system, upon receipt of a request for interference cancellation for a first MS serviced by a neighbor BS, a channel estimator estimates a channel from the first MS and a channel from a second MS serviced by the BS. A beam coefficient generator generates a first beam coefficient based on channel estimates of the first and second MSs and a second beam coefficient based on the channel estimate of the second MS. An interference cancellation decider determines whether to perform interference cancellation for the first MS using the first and second beam coefficients.

According to a further aspect of the present invention, in an operation method of a BS in a multiple antenna system, the channel state of an MS serviced by the BS is checked and a determination is made whether to cancel interference for the MS according to the channel state of the MS. A determination is made whether to allocate a fixed channel to the MS according to the determination as to whether to cancel interference for the MS. Interference cancellation information and channel allocation information of the MS are sent to a neighbor BS.

According to still another aspect of the present invention, in an operation method of a BS in a multiple antenna system, a channel from a first MS serviced by a neighbor BS and a channel from a second MS serviced by the BS are estimated, upon receipt of a request for interference cancellation for the first MS. A first beam coefficient is generated based on channel estimates of the first and second MSs and a second beam coefficient is generated based on the channel estimate of the second MS. A determination is made whether to perform the interference cancellation for the first MS using the first and second beam coefficients. If the interference cancellation is performed for the first MS, beamforming is performed using the first beam coefficient.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a beamforming technique for preventing degradation of the reception performance of Mobile Stations (MSs) in a smart antenna system. In the smart antenna system, a first Base Station (BS) forms a beam for a first MS that it serves and a second BS forms a beam for a second MS that it serves. When the first BS requests active nulling for the first MS to the second BS, the second BS forms a beam for the second MS, considering the channel information of the first MS, thereby reducing interference with the first MS. The active nulling is the beamforming for the second MS, taking into account the channel information of the first MS to decrease interference with the first MS. Thus, the active nulling involves computation of a weight to be applied to the beam for the second MS on the channel information of the first MS in the second BS.

A BS requesting active nulling such as the first BS is called a serving BS, and a BS performing the active nulling such as the second BS is called a neighbor BS. An MS receiving a service from the serving BS is called the first MS, and an MS receiving a service from the neighbor BS is called the second MS.

Figure 3:
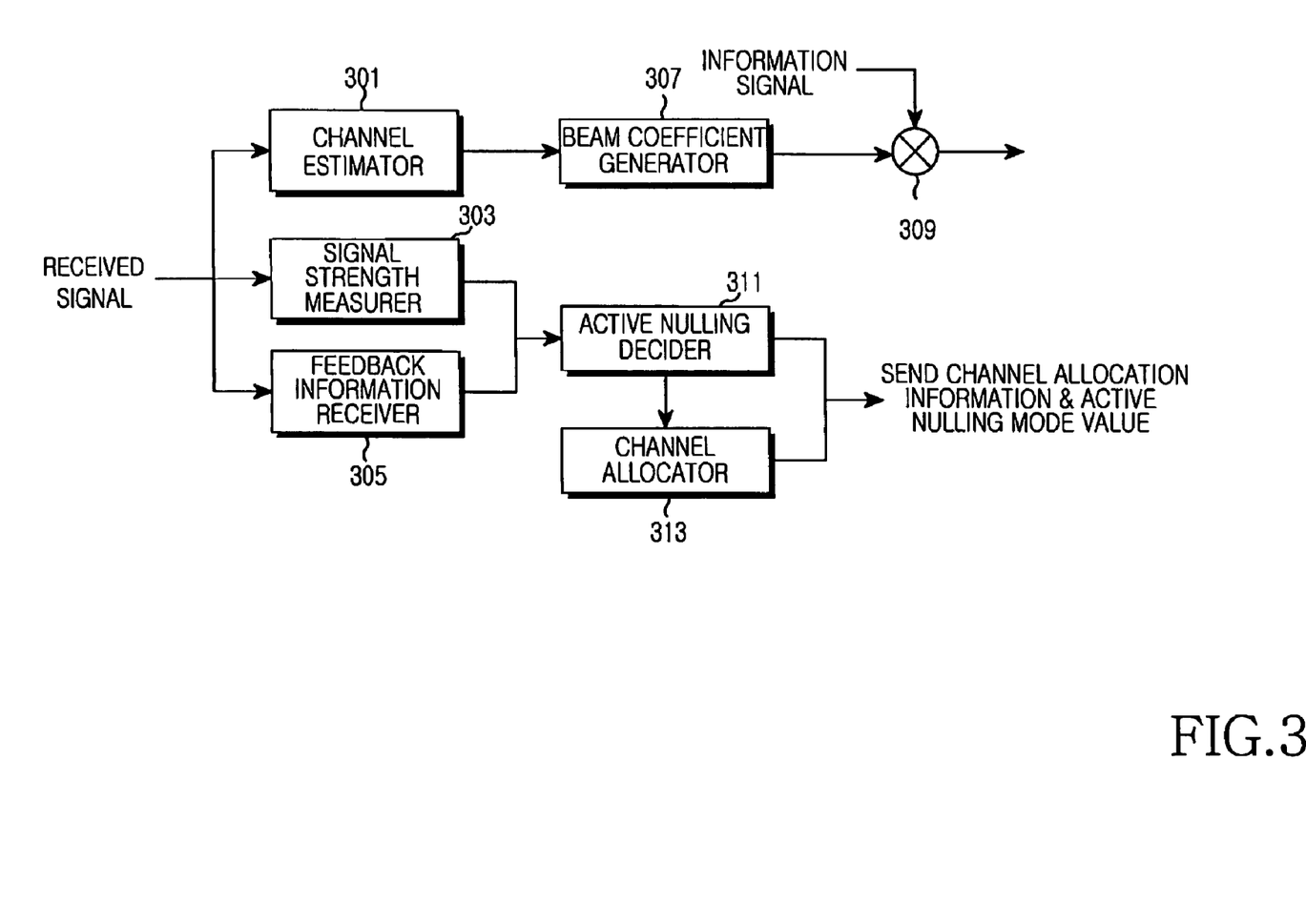
FIG. 3 is a block diagram of a serving BS according to the present invention.

FIG. 3 shows a serving BS according to the present invention. The serving BS includes a channel estimator 301, a signal strength measurer 303, a feedback information receiver 305, a beam coefficient generator 307, a multiplier 309, an active nulling decider 311, and a channel allocator 313.

The channel estimator 301 performs channel estimation using a pilot signal included in a signal received from the first MS. The signal strength measurer 303 measures the strength of the received signal. The feedback information receiver 305 detects feedback information included in the received signal. The feedback information is the state information of a downlink channel from the serving BS measured by the first MS.

The beam coefficient generator 307 generates a beam coefficient to be applied to beamforming for the first MS using the channel estimate received from the channel estimator 301. The multiplier 309 multiplies an information signal to be sent to the first MS by the beam coefficient, prior to transmission to the first MS.

The active nulling decider 311 determines whether active nulling is required for the first MS according to the channel state of the first MS. Specifically, the active nulling decider 311 makes the determination using the uplink signal strength received from the signal strength measurer 303 and the downlink signal information received from the feedback information receiver 305 according to the following Equation (2). Then the active nulling decider 311 sends the decided active nulling information about the first MS to the channel allocator 313 and the neighbor BS.

$$f(C/I_{MS}, P_{UL}) \triangleq [C/I_{MS} < C/I_{threshold}] \mid [P_{UL} < P_{threshold}] \quad (2)$$

In Equation (2), $f(A, B) \triangleq [A] \mid [B]$ is a function that returns the value TRUE if one of the conditions [A] and [B] is true, $C/I_{MS}$ represents the feedback information (e.g. the C/I of a downlink signal) included in the signal received from the first MS, $P_{UL}$ represents the signal strength of the signal received from the first MS (e.g. the uplink signal strength), and $C/I_{threshold}$ and $P_{threshold}$ represent a threshold for the feedback information and a threshold for the received signal strength, respectively.

By Equation (2), the serving BS compares the C/I of the uplink signal representing the channel state of the first MS and the received signal strength with the thresholds and determines whether active nulling should be performed for the first MS according to the comparison result.

If Equation (2) is fulfilled, that is, the first MS is in a poor channel state, the serving BS sets an active nulling mode value to 1 in order to perform active nulling for cancellation of interference from the neighbor BS. If equation (2) is not fulfilled, that is, the first MS is in a good channel state, the serving BS sets the active nulling mode value to 0, considering that the active nulling is not needed.

The channel allocator 313 determines whether to allocate a fixed channel to the first MS based on the active nulling information received from the active nulling decider 311. If the active nulling mode value is 1, the channel allocator 313 allocates a fixed channel to the first MS. If the active nulling mode value is 0, the channel allocator 313 does not allocate the fixed channel to the first MS. If the fixed channel has already been allocated to the first MS, the channel allocator 313 releases the fixed channel. The fixed channel is a channel that is allocated fixedly for forming a fixed beam for the first MS to cancel interference with the first MS from the neighbor BS.

The channel allocator 313 provides the channel allocation information to the neighbor BS.

Figure 4:
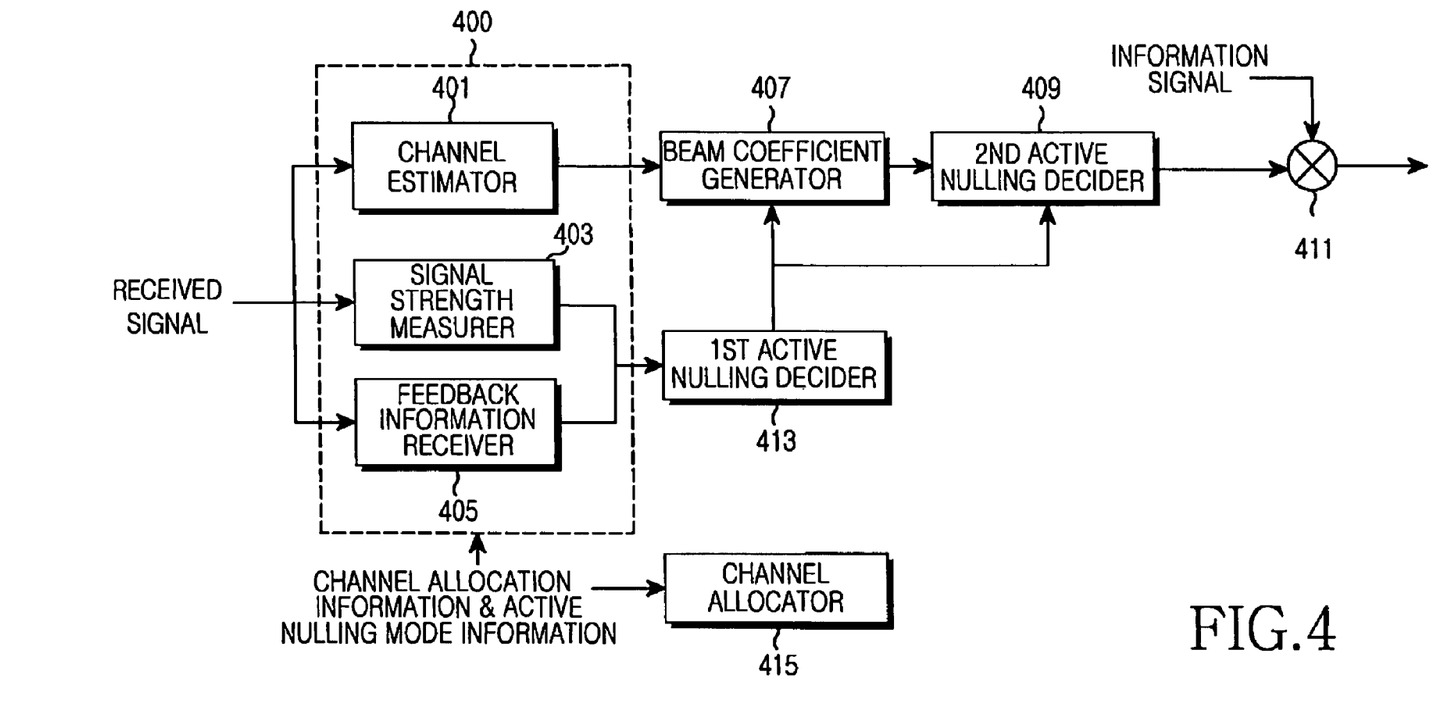
FIG. 4 is a block diagram of a neighbor BS according to the present invention.

FIG. 4 shows the neighbor BS according to the present invention. The neighbor BS includes a channel estimator 401, a signal strength measurer 403, a feedback information receiver 405, a beam coefficient generator 407, a multiplier 411, active nulling deciders 409 and 413, and a channel allocator 415.

The channel estimator 401 performs channel estimation using a pilot signal included in a signal received from the second MS. According to the present invention, the channel estimator 401 performs channel estimation for the first MS using the channel allocation information and active nulling mode information of the first MS received from the serving BS. During the channel estimation, the channel estimator 401 checks communication environment information of the first MS (e.g. pilot pattern) using the channel allocation information, receives a pilot signal from the first MS, and estimates the channel of the first MS based on the communication environment information.

The signal strength measurer 403 measures the strength of the signal received from the second MS. The feedback information receiver 405 detects feedback information included in the received signal. The feedback information is the state information of a downlink channel from the neighbor BS measured by the second MS.

The beam coefficient generator 407 generates a beam coefficient to be applied to beamforming for the second MS using the channel estimate received from the channel estimator 401 and active nulling information received from the first active nulling decider 413. If the first active nulling decider 413 determines to perform active nulling for the first MS, the beam coefficient generator 407 generates a first beam coefficient based on the channel estimates of the first and second MSs. At the same time, the beam coefficient generator 407 generates a second beam coefficient based on the channel estimate of the second MS.

If the first active nulling decider 413 determines not to perform active nulling for the first MS, the beam coefficient generator 407 generates the second beam coefficient based on the channel estimate of the second MS.

The first active nulling decider 413 determines whether to perform active nulling for the first MS, taking into account the channel state of the second MS. Specifically, the first active nulling decider 413 calculates Equation (2) using the uplink signal strength and the downlink signal information of the second MS received from the signal strength measurer 403 and the feedback information receiver 405 in determining whether to perform active nulling for the first MS. If Equation (2) is satisfied, i.e. the second MS is in a poor channel state, the first active nulling decider 413 determines not to perform active nulling for the MS. If Equation (2) is not satisfied, i.e. the second MS is in a good channel state, the first active nulling decider 413 determines to perform active nulling for the MS.

The second active nulling decider 409 determines whether to use the first beam coefficient. To be more specific, in the case of active nulling, the second active nulling decider 409 receives the first and second beam coefficients from the beam coefficient generator 407, estimates the channel state of the second MS when beamforming is performed for the second MS using the first beam coefficient, and decides as to whether to use the first beam coefficient by the following Equation (3)

$$|W_n|^2 - |W_s|^2 \leq T_{th} \tag{3}$$

where, $W_n$ represents the beam coefficient calculated using the channel estimate of the second MS, $W_s$ represents the beam coefficient calculated using the channel estimates of the first and second MSs, and $T_{th}$ represents a threshold by which channel changes after beamforming using $W_n$ and $W_s$ are evaluated.

If Equation (3) is satisfied, that is, the second MS is in a good channel state despite active nulling for the first MS, the second active nulling decider 409 sends the first beam coefficient to the multiplier 411. On the contrary, if Equation (3) is not satisfied, that is, the second MS is in a poor channel state due to active nulling for the first MS, the second active nulling decider 409 sends the second beam coefficient to the multiplier 411.

The multiplier 411 forms a beam by multiplying an information signal to be sent to the second MS by the received beam coefficient, prior to transmission.

The channel allocator 415 determines whether to allocate a fixed channel to the second MS based on the channel allocation information and active nulling information received of the first MS received from the serving BS. If the active nulling mode value is 1, the channel allocator 415 allocates a fixed channel to the second MS. If the active nulling mode value is 0, the channel allocator 415 does not allocate the fixed channel to the second MS and further, if the fixed channel has already been allocated to the second MS, it releases the fixed channel. The fixed channel is a channel that is allocated fixedly for forming a fixed beam for the second MS to cancel interference with the first MS from the neighbor BS.

Figure 5:
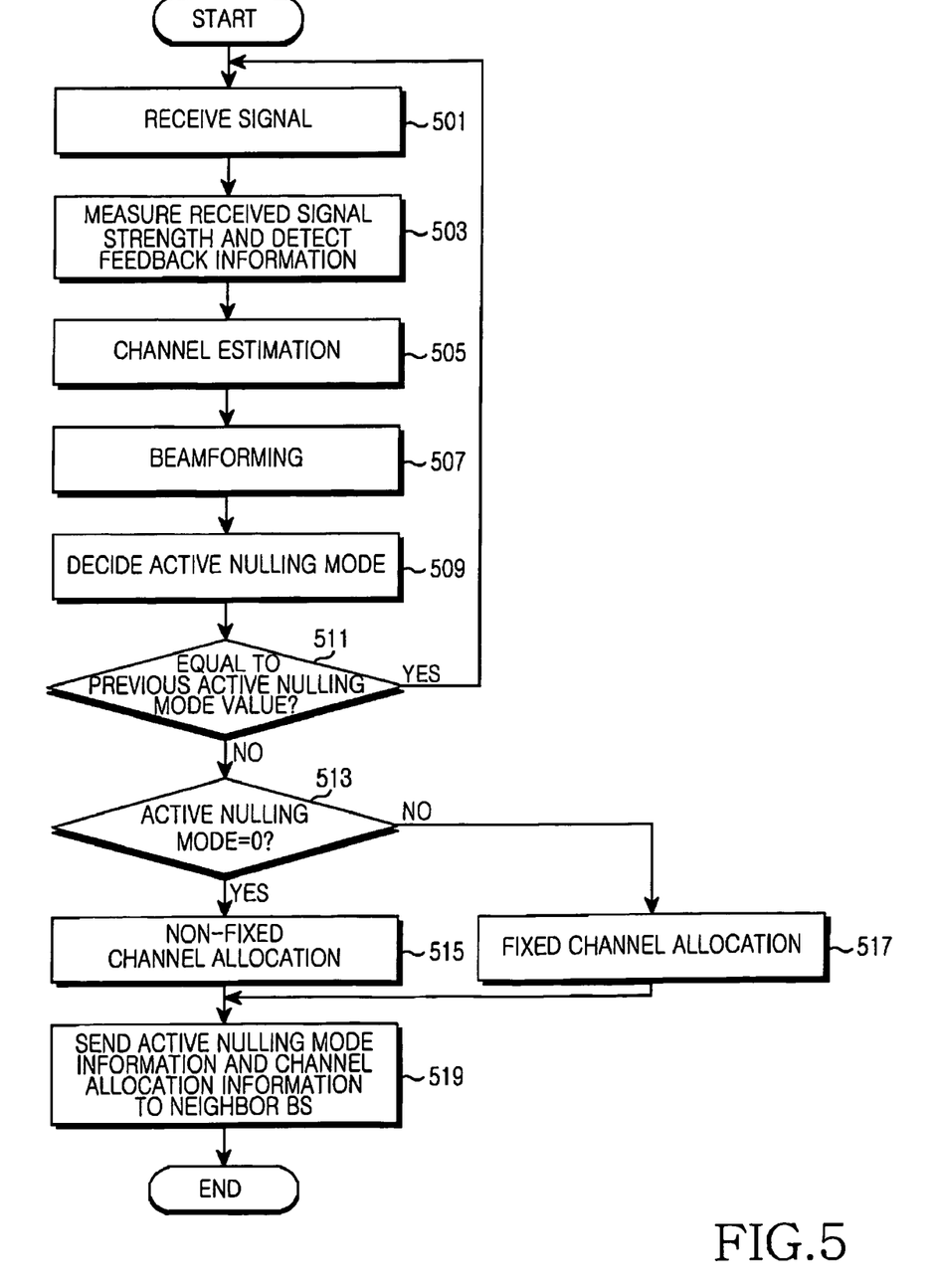
FIG. 5 is a flowchart illustrating a beamforming operation in the serving BS according to the present invention.

FIG. 5 shows a beamforming operation in the serving BS according to the present invention. The serving BS monitors reception of signals from MSs within its cell area in step 501. Upon receipt of signals from MSs, the serving BS measures the strength of the received signal and detects feedback information (e.g. the C/I of a downlink signal) from the received signal for each of the MS in step 503.

In step 505, the serving BS estimates a channel from the MS using a pilot signal included in the received signal. The serving BS then generates a beam coefficient based on the channel estimate and forms a beam for the MS by multiplying the beam coefficient by transmission information in step 507.

After the beamforming, the serving BS determines whether active nulling should be performed for the MS by computing Equation (2) using the received signal strength and the feedback information in step 509. If Equation (2) is satisfied, the serving BS sets an active nulling mode value to 1 to perform active nulling for the MS. If Equation (2) is not satisfied, the serving BS sets the active nulling mode value to 0 because active nulling is not needed for the MS.

In step 511, the serving BS compares the active nulling mode value with a previous active nulling mode value for the MS.

If the two active nulling mode values are equal, the serving BS returns to step 501 to continue the beamforming.

If the two active nulling mode values are different, the serving BS checks the active nulling mode value decided in step 509 in step 513.

If the active nulling mode value is 0, the serving BS releases an existing fixed channel in step 515 and proceeds to step 519.

On the contrary, if the active nulling mode value is 1, the serving BS allocates the fixed channel to the MS in step 517.

In step 519, the serving BS sends the active nulling information and channel allocation information of the MS to the neighbor BS. Then the serving BS ends the algorithm.

Figure 6:
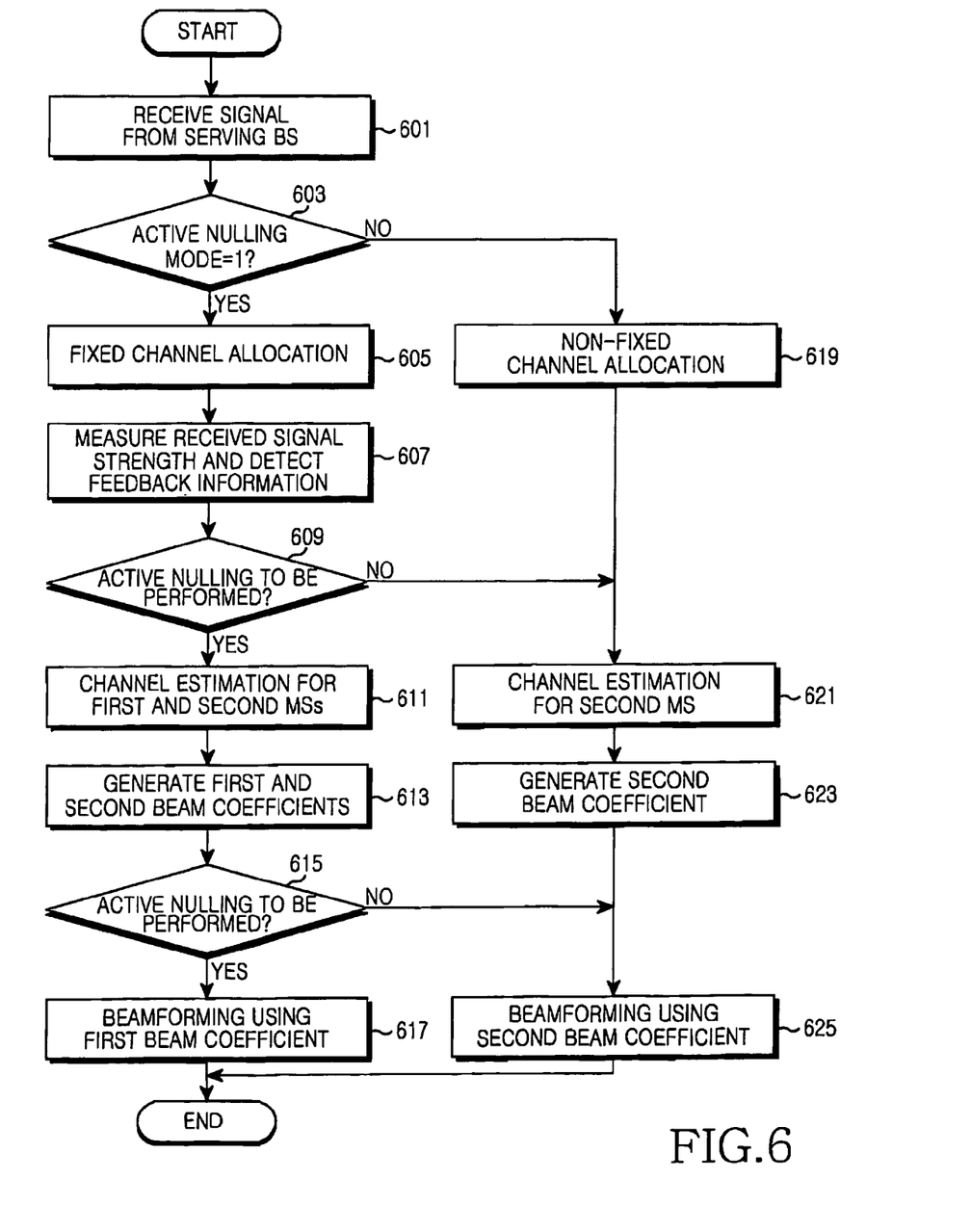
FIG. 6 is a flowchart illustrating an active nulling operation in the neighbor BS according to the present invention.

FIG. 6 shows an active nulling operation in the neighbor BS according to the present invention. The neighbor BS monitors reception of channel allocation information and active nulling information of the first MS from the serving BS in step 601. Upon receipt of channel allocation information and active nulling information, the neighbor BS checks the received active nulling mode value in step 603.

If the active nulling mode value is 0, that is, a fixed channel is not allocated to the first MS, the neighbor BS does not allocate a fixed channel to the second MS in step 619. If the fixed channel has already been allocated, the neighbor BS releases it from the second BS. Then the neighbor BS ends the process.

If the active nulling mode value is 1, that is, a fixed channel is allocated to the first MS, the neighbor BS allocates a fixed channel to the second MS in step 605.

In step 607, the neighbor BS measures the strength of a signal received from the second MS and detects feedback information from the received signal.

In step 609, the neighbor BS determines whether active nulling can be performed for the first MS by computing Equation (2) using the received signal strength and the feedback information of the second MS.

If Equation (2) is satisfied, which implies that the second MS is in a poor channel state and active nulling cannot be performed for the first MS, the neighbor BS estimates the channel of the second MS using a pilot signal included in the received signal in step 621.

In step 623, the neighbor BS generates a second beam coefficient using the channel estimate of the second MS only.

The neighbor BS forms a beam for the second MS using the second beam coefficient, without active nulling for the first MS in step 625.

If Equation (2) is not satisfied, which implies that the second MS is in a good channel state and thus active nulling can be performed for the first MS, the neighbor BS estimates the channel of the second MS using the pilot signal in step 611. The neighbor BS also estimates the channel of the first MS based on the channel allocation information of the first MS.

In step 613, the neighbor BS generates a first beam coefficient using the channel estimates of the first and second MSs and the second beam coefficient using the channel estimate of the second MS only.

The neighbor BS determines whether to perform active nulling for the first MS by computing Equation (3) using the first and second beam coefficients in step 615. That is, a decision is made as to whether to perform active nulling for the first MS by estimating the channel state of the second MS.

If Equation (3) is satisfied, the neighbor BS forms a beam for the second MS using the first beam coefficient, that is, performs active nulling for the first MS in step 617. Then the neighbor BS ends the process.

If Equation (3) is not satisfied, the neighbor BS forms a beam for the second MS using the second beam coefficient without active nulling for the first MS in step 625. Then the neighbor BS ends the process.

Figure 7:
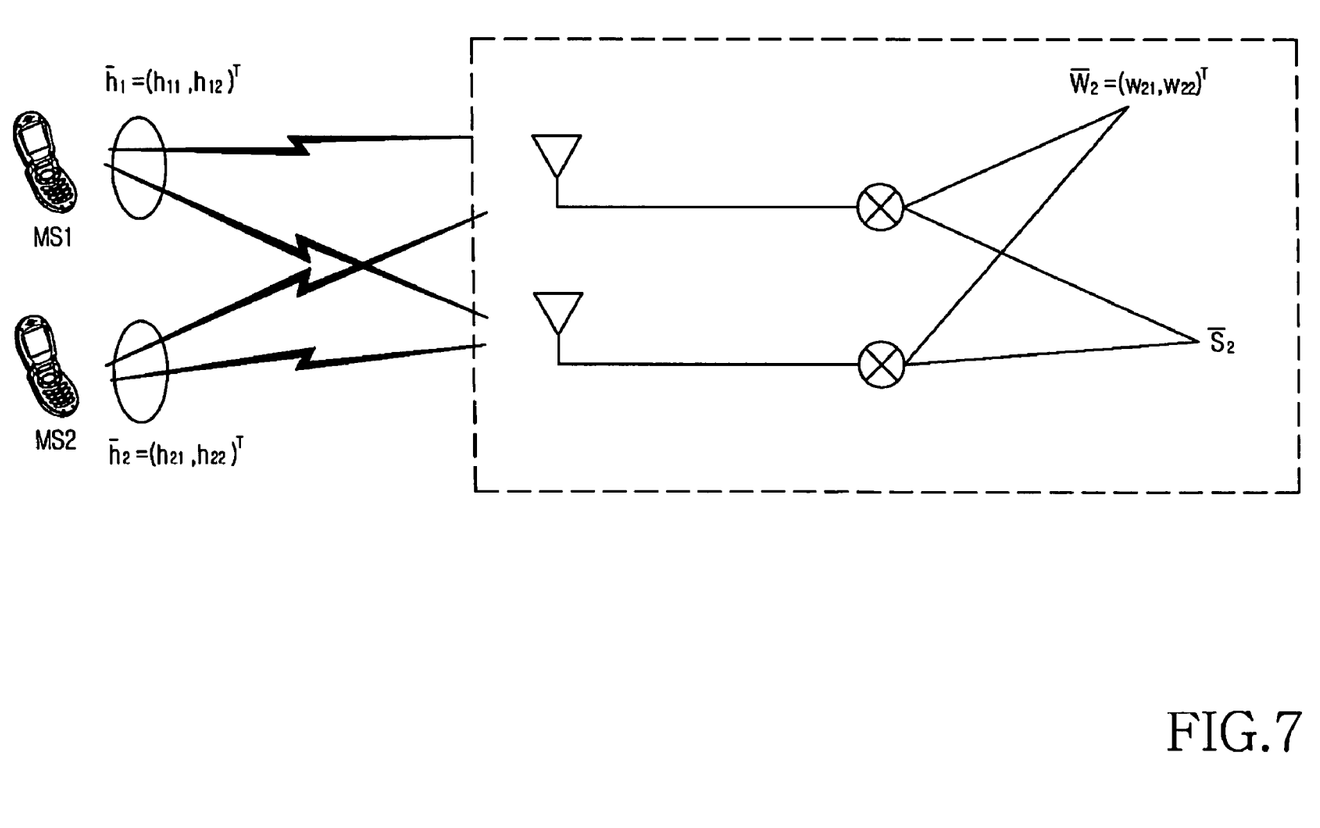
FIG. 7 illustrates an active nulling mechanism according to the present invention.

FIG. 7 shows an active nulling mechanism according to the present invention. When a BS with two antennas sends signals to two MSs on different channels, the transmitted signals are expressed by Equation (4)

$$\begin{pmatrix} y_1 \\ y_2 \end{pmatrix} = Y = H^H \overline{w}_2 \overline{s}_2 + N \tag{4}$$

where $y_1$ represents a signal received at a first MS (MS 1), $y_2$ represents a signal received at a second MS (MS 2), H represents the channels, and $w_2$ represents weights applied to MS 1 and MS 2.

To perform nulling on the signal for MS 1 and beamforming on the signal for MS 2, the BS has to find the weights $\overline{w}_2$ that satisfy Equation (5)

$$h^*_{11}w_{21} + h^*_{12}w_{22} = 0$$

$$h^*_{21}w_{21} + h^*_{22}w_{22} = 1 \tag{5}$$

where $h_{i,j}$ represents a $j^{th}$ antenna for an $i^{th}$ MS and $w_{i,j}$ represents a weight applied to the $j^{th}$ antenna for the $i^{th}$ MS.

While one of the two MSs is subject to active nulling in the illustrated case of FIG. 7, active nulling can be performed in the same manner for two or more MSs.

In accordance with the present invention as described above, a neighbor BS performs active nulling for an MS for which a serving BS performs beamforming in a smart antenna system. Therefore, interference from the neighbor BS is reduced and thus the reception performance of the MS is improved.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus of a Base Station (BS) in a communication system, comprising:
    a channel state checker for checking a channel state of a Mobile Station (MS) serviced by the BS;
    an interference cancellation decider for making a determination whether to cancel interference for the MS according to the channel state of the MS; and
    a channel allocator for making a determination whether to allocate a fixed channel to the MS according to the determination of the interference cancellation decider,
    wherein the channel allocator allocates the fixed channel to the MS when a determination of interference cancelling is made, and does not allocate the fixed channel to the MS when a determination of interference cancelling is not made, and sends channel allocation information to a neighbor BS,
    wherein the fixed channel is a channel that is allocated for forming a fixed beam for the MS, and
    wherein the neighbor BS forms a beam taking into account the channel allocation information.

2. The apparatus of claim 1, further comprising:
    a channel estimator for estimating a channel from the MS using a signal received from the MS;
    a beam coefficient generator for generating a beam coefficient based on a channel estimate of the MS; and
    a multiplier for forming a beam for the MS by multiplying the beam coefficient by a transmission information signal.

3. The apparatus of claim 1, wherein the interference cancellation decider makes a determination whether to cancel interference with the MS using received signal strength and feedback information, and notifies the neighbor BS whether interference will be cancelled.

4. The apparatus of claim 3, wherein the interference cancellation decider makes a determination to cancel interference with the MS, when the feedback information is less than a first threshold, or when the received signal strength is less than a second threshold.

5. The apparatus of claim 1, wherein the channel state checker comprises:
   a signal strength measurer for measuring a strength of a received signal; and
   a feedback information receiver for detecting feedback information in the received signal.

6. The apparatus of claim 5, wherein the feedback information receiver detects a Carrier-to-Interference Ratio (C/I) of a downlink signal in the received signal.

7. An apparatus of a Base Station (BS) in a communication system, comprising:
   a channel estimator for, upon receipt of a request for interference cancellation for a first Mobile Station (MS) serviced by a neighbor BS, estimating a channel from the first MS and a channel from a second MS serviced by the BS;
   a beam coefficient generator for generating a first beam coefficient based on channel estimates of the first and second MSs and a second beam coefficient based on the channel estimate of the second MS;
   an interference cancellation decider for determining whether to perform interference cancellation for the first MS using the first and second beam coefficients; and
   a channel allocator for allocating a fixed channel to the second MS when interference cancellation is performed for the first MS,
   wherein the fixed channel is a channel that is allocated for forming a fixed beam for the second MS in order to avoid interference to the first MS, and
   wherein the channel estimator estimates the channel of the second MS using a signal received from the second MS, and estimates the channel of the first MS using channel allocation information of the first MS received from the neighbor BS.

8. The apparatus of claim 7, wherein the interference cancellation decider determines whether to perform the interference cancellation for the first MS by the following equation, $$|W_n|^2 - |W_s|^2 \leq T_{th}$$

where $W_n$ is the second beam coefficient, $W_s$ is the first beam coefficient, and $T_{th}$ is a threshold by which channel changes after beamforming using $W_n$ and $W_s$ are evaluated.

9. The apparatus of claim 7, wherein the interference cancellation decider selects the first beam coefficient for beamforming when interference cancellation is performed, and the second beam coefficient when interference cancellation is not performed.

10. The apparatus of claim 9, further comprising a multiplier for forming a beam for the second MS by multiplying the selected beam coefficient by a transmission information signal.

11. The apparatus of claim 7, further comprising a first interference cancellation decider for determining whether to perform the interference cancellation for the first MS according to the channel state of the second MS, wherein the beam coefficient generator generates the first and second beam coefficients when interference cancellation is performed for the first MS, and generates the second beam coefficient when interference cancellation is not performed for the first MS.

12. The apparatus of claim 11, wherein the first interference cancellation decider determines whether to perform interference cancellation for the first MS using received signal strength and feedback information of the second MS.

13. The apparatus of claim 12, wherein the first interference cancellation decider determines to perform interference cancellation for the first MS when the feedback information is less than a first threshold, or the received signal strength is less than a second threshold.

14. The apparatus of claim 11, wherein the interference cancellation decider determines whether to perform the interference cancellation for the first MS when the interference cancellation decider receives the first and second beam coefficients from the beam coefficient generator.

15. An operation method of a Base Station (BS) in a communication system, comprising the steps of:
   checking a channel state of a Mobile Station (MS) serviced by the BS;
   determining whether to cancel interference for the MS according to the channel state of the MS;
   determining whether to allocate a fixed channel to the MS according to the determination as to whether to cancel interference for the MS; and
   sending channel allocation information of the MS to a neighbor BS,
   wherein determining whether to allocate a fixed channel to the MS comprises:
   determining to allocate the fixed channel to the MS when it is determined to cancel interference for the MS; and
   determining not to allocate the fixed channel to the MS when it is determined not to cancel interference for the MS,
   wherein the fixed channel is a channel that is allocated for forming a fixed beam for the MS, and
   wherein the neighbor BS forms a beam taking into account the channel allocation information.

16. The operation method of claim 15, wherein the step of determining whether to cancel interference for the MS comprises:
   comparing feedback information with a first threshold;
   comparing received signal strength with a second threshold; and
   determining to cancel interference for the MS when the feedback information is less than the first threshold, or the received signal strength is less than the second threshold.

17. The operation method of claim 15, wherein the channel state of the MS is determined according to a strength of a signal received from the MS and feedback information included in the received signal.

18. The operation method of claim 17, wherein the feedback information is the Carrier-to-Interference Ratio (C/I) of a downlink signal.

19. An operation method of a Base Station (BS) in a communication system, comprising the steps of:
   estimating a channel from a first Mobile Station (MS) serviced by a neighbor BS and a channel from a second MS serviced by the BS, upon receipt of a request for interference cancellation for the first MS;
   generating a first beam coefficient based on channel estimates of the first and second MSs and a second beam coefficient based on the channel estimate of the second MS;
   determining whether to perform the interference cancellation for the first MS using the first and second beam coefficients; and
   performing beamforming using the first beam coefficient when interference cancellation is performed for the first MS, wherein, when interference cancellation is performed for the first MS, allocating a fixed channel to the second MS, wherein the fixed channel is a channel that is allocated for forming a fixed beam for the second MS in order to avoid interference to the first MS, and wherein estimating the channel comprises:

estimating the channel of the second MS using a signal received from the second MS; and estimating the channel of the first MS using channel allocation information of the first MS received from the neighbor BS.

20. The operation method of claim 19, further comprising:

determining whether to perform interference cancellation for the first MS using channel state information of the second MS;

estimating the channel of the second MS when interference cancellation is performed for the first MS;

estimating the channel of the second MS when interference cancellation is not performed for the first MS;

generating a beam coefficient using the channel estimates of the second MS; and performing beamforming for the second MS using the beam coefficient.

21. The operation method of claim 20, wherein the channel state information includes strength of a signal and feedback information received from the second MS.

22. The operation method of claim 19, wherein the step of determining whether to perform interference cancellation for the first MS uses the following equation, $$|W_n|^2 - |W_s|^2 \leq T_{th}$$

where $W_n$ is the second beam coefficient, $W_s$ is the first beam coefficient, and $T_{th}$ is a threshold by which channel changes after beamforming using $W_n$ and $W_s$ are evaluated.

23. The operation method of claim 19, further comprising performing beamforming using the second beam coefficient, when interference cancellation is not performed for the first MS.

* * * * *